Sept. 25, 1934.  J. BIJUR  1,974,416
LUBRICATION
Filed Oct. 4, 1930  3 Sheets-Sheet 1

INVENTOR
Joseph Bijur
BY
Dean, Fairbank, Hirsch & Foster
his ATTORNEYS

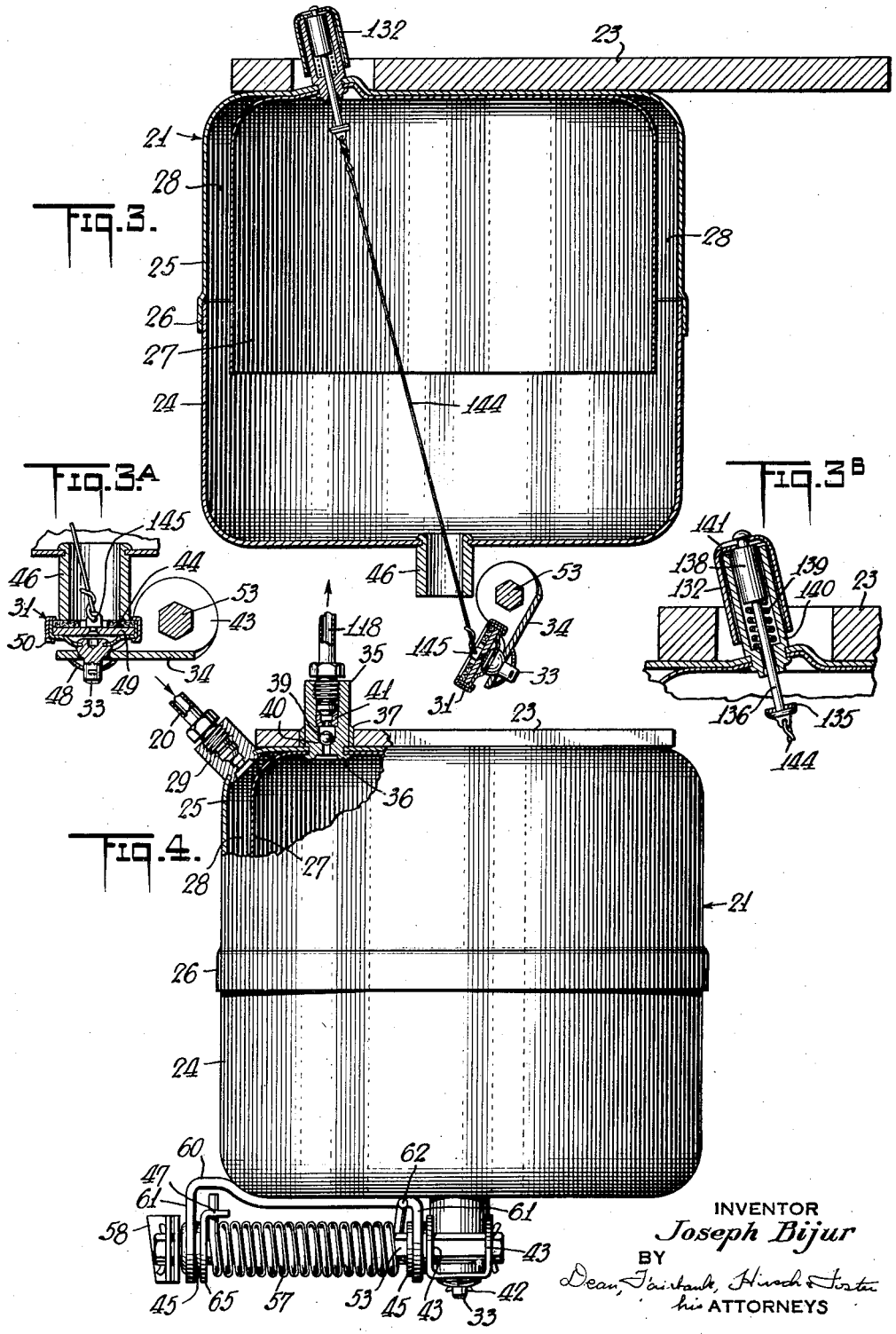

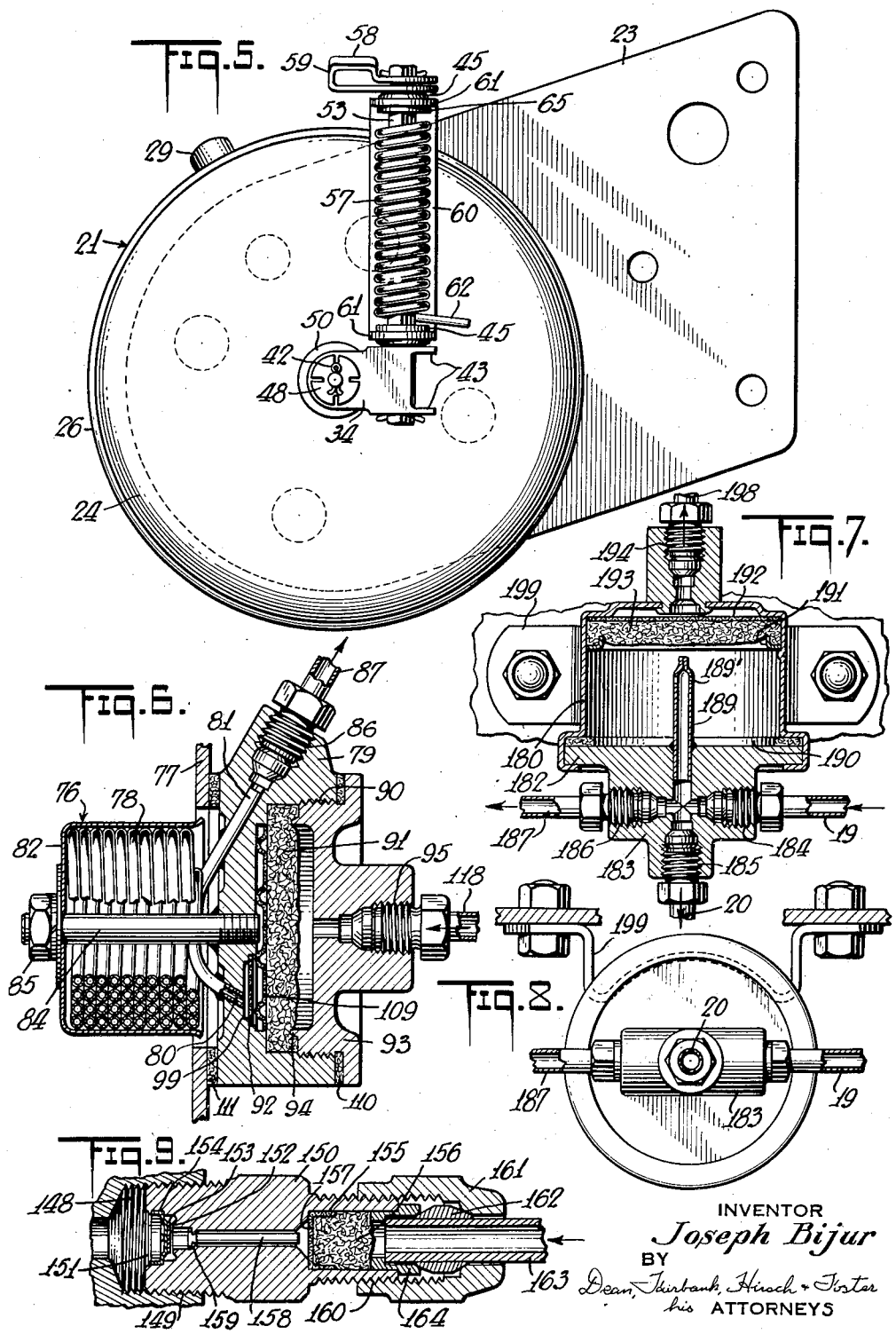

Patented Sept. 25, 1934

1,974,416

UNITED STATES PATENT OFFICE

1,974,416

LUBRICATION

Joseph Bijur, New York, N. Y., assignor to Auto Research Corporation, a corporation of Delaware Application October 4, 1930, Serial No. 486,380

25 Claims. (Cl. 184—7)

The present invention relates to liquid distribution, and it is particularly concerned with central lubricating systems and has a special field of usefulness in the lubrication of some or all of the bearings of a motor vehicle.

It is among the objects of the invention to provide a simple, inexpensive, strictly automatic installation, particularly for automotive vehicles, which will feed clean oil to some or all of the various engine and chassis bearings in accordance with the diverse requirements thereof, and substantially regardless of varying atmospheric temperatures and varying lubricant viscosity at such temperatures.

It is another object to provide a circulatory lubricating system for an automotive engine, in which the oil may be cleansed during the entire period of operation of said engine without the utilization of readily cloggable members, such as filters, necessitating frequent renewal and replacement, and with the utilization of convenient and inexpensive apparatus, the cleansing of which involves a minimum of difficulty and no dismantling.

A feature of the invention is the use of the ordinary engine oil pump deriving oil from the engine oil pan, to supply the chassis lubricating system, and of appropriate cleansing means to clean, not only the oil passed into the chassis system, but also to clean an additional amount of oil which is returned to the oil pan.

A common dirt settling chamber may serve as the cleansing means, both for the chassis oil and the engine oil. Preferably the resistance to the flow from the settling chamber is of such magnitude that the upward oil stream through the settling chamber, under propulsive action of the engine oil pump, is slower than the rate of sedimentation, whereby abstraction of dirt within the settling chamber during operation of the system is substantially assured. The settling chamber is preferably heated from the top as by suspending from a bracket connected to the exhaust manifold, thereby to render the oil more fluid and thus promote sedimentation and prevent convection.

The desired slow feed through the settling chamber is consistent with the needs of a chassis lubricating system, which should feed oil at extremely slow rate to meet the current requirements of the chassis bearings. For this purpose a drip plug system of the general type described and claimed in my prior patents No. 1,632,771 of June 14, 1927 and No. 1,732,212 of October 15, 1929, is particularly suitable. While the drip plugs may be made with such fine flow restrictions, as themselves to retard the flow to the required degree under continuous feed at full pump pressure, it is preferred to utilize drip plugs within the range of proportions specified in my prior patents, and to afford the required additional retardation by means of a fixed master flow restriction of determining or controlling resistance to flow, through which the chassis system is supplied, and which when disposed at the water jacket, or other part of temperature nearly constant summer and winter, obviates the great falling off in rate of feed to the chassis bearings, otherwise occurring due to increase in viscosity of the oil in the chassis lines during cold weather.

Another feature of the invention is to impose in the path of return flow to the engine oil pan from the settling chamber a compensating flow resistance exposed to the atmosphere, which thus imposes upon said engine oil return, temperature and flow resistance conditions varying substantially with those in the chassis lines, so that the proportional division of the output from the settling chamber, as between the chassis and the settled oil return, will not be materially disturbed due to the otherwise disproportionate rise of resistance of the chassis lines in winter. It is preferred to provide in the engine return line, in advance of the compensating resistance, extra length of pipe subjected to cooling effect, preferably from the atmosphere, so that the hot oil from the settling chamber will be cooled by the time it reaches the balancing or compensating resistance in the engine oil return.

A lubricating system of the type set forth treats oil at such a slow rate that the sand frequently present in the new engine from the casting operation and metallic particles, due to machining, as well as any other hard foreign bodies present, might not be abstracted thereby with sufficient speed, adequately to protect the bearing parts of the new engine from abrasion.

It is accordingly a further object of the invention, in a system of the above type, promptly and effectively to abstract such sand or metallic particles initially present in the new engine, without, however, impairing the effective and slow operation of the settling instrumentality and without the need for any special manual operation or other special precautions.

For this purpose a preferred embodiment utilizes a compact engine conditioning filter connected in parallel with the settling chamber, such filter having relatively low resistance, to pass engine oil freely and filter the same quickly while the engine is new. As said filter becomes clogged with the sand, metallic particles and other particles abstracted from the engine oil, its resistance rises, until eventually the effectiveness of this engine conditioning filter materially decreases and the settling chamber principally or solely will cleanse the engine oil, which by now has been rid of all of the hard abrasive particles taken up by the engine conditioning filter.

In the accompanying drawings, in which is shown one of various possible embodiments of the several features of the invention:

Figs. 3 and 4 are side views and Fig. 5 is a bottom view of a settling tank, Fig. 3 being slightly modified to show a venting arrangement, and Figs. 3A and 3B are enlarged sectional views of the drain and venting arrangement, respectively.

Fig. 6 is a side sectional view of a master resistance unit;

Figs. 7 and 8 are side sectional and top views, respectively, of an engine conditioning filter;

Fig. 9 is a side sectional view of a preferred form of a metering device, and

Figure 1:
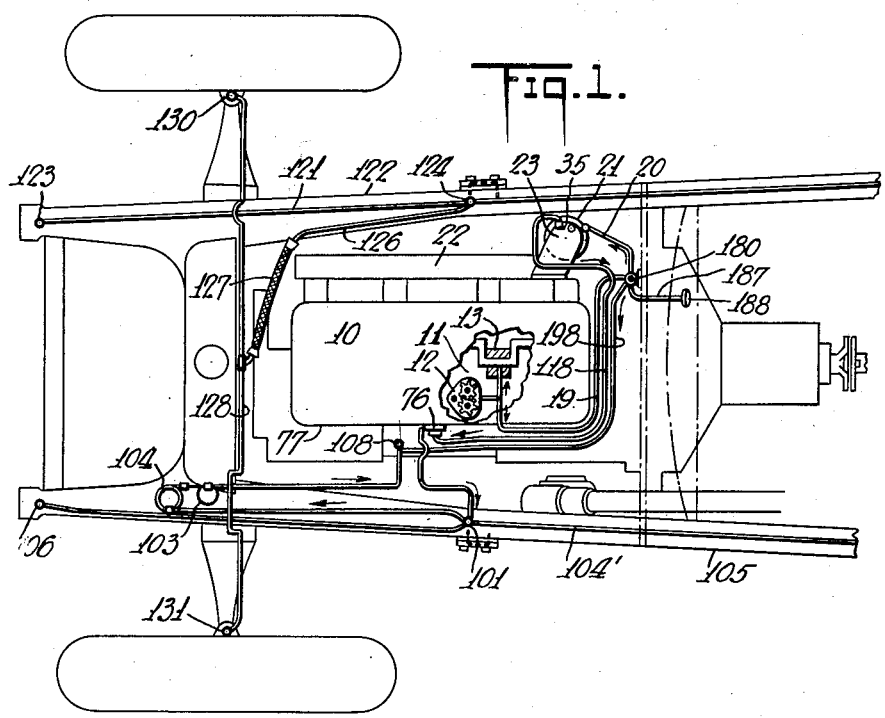
Fig. 1 is a diagrammatic plan of the front part of the lubricating layout embodying the supply system of the present invention.
Figure 2:
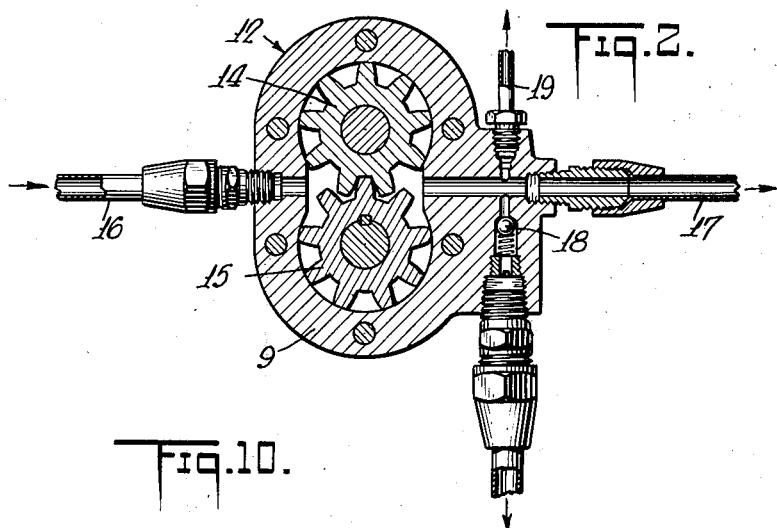
Fig. 2 is a top sectional view showing the details of a gear pump.

Referring now to the drawings, there is shown in Fig. 1 the plan view of an automobile chassis having an engine 10, equipped with an engine oil pump 12 (see also Fig. 2), which receives lubricant from the crank case pan 11 and supplies it to the various engine bearings 13. The pump may comprise intermeshing gears 14 and 15, in a casing 9, an inlet 16 from the crank case lubricant reservoir, an outlet 17 leading to the bearings of the crank shaft and the other engine bearings and a relief valve 18 permitting excess pump output to return to the crank case, when the pressure would otherwise rise to say above 30 pounds.

Lubricant is supplied to the sedimentation tank 21 from the third outlet line 19 and the connecting conduit 20 (see Fig. 1). The sedimentation tank is supported upon the exhaust manifold 22 by the plate 23 (see Figs. 1, 3, 4 and 5) and depends downwardly therefrom. The tank 21 consists of a cup-shaped base 24 and a cap member 25 telescoped together at 26. Attached to the top of the cap member 25 is the skirt 27 of somewhat similar shape, but of smaller diameter, so that there will be an annular space 28 between the outside of the skirt 27 and the inside of the cap 25. The skirt 27 extends a substantial distance downwardly within the sedimentation tank 21, preferably somewhat more than about half its depth. At the outer upper edge of the cap 25 is the inlet connection 29 (see Fig. 4), which is flanged about the edge of an opening in the cap 25. The pipe terminal 20 is attached thereto. Passing through openings in the supporting bar 23 and in the tops of the inverted cups 25 and 27 is the outlet connection 35 to the pipe 118, which connection is flanged over at 36 upon the inside of the skirted cup 27 and soldered at 37 to the plate 23.

From the outlet connection 35 the pipe 118 leads to a hot master resistance 76 (see Figs. 1 and 6) inserted in the water jacket 77 and consisting of a long coil of small bore tubing 78. This master resistance may also be inserted in or adjacent to any other place of elevated temperature about the engine structure, such as the exhaust manifold, the intake manifold, the crank case and so forth, but the water jacket is preferred because it is ordinarily thermostatically maintained at nearly constant temperature.

The resistance coil 78 is supported upon the base plate 79 to which the inlet end 80 and the outlet end 81 of said coil are attached in liquid-tight relation. The coil is enclosed in the protecting cup 82, projecting inside of the wall of the water jacket 77. This cup is pressed against and around the coil 78 by means of the nut 85 threaded upon the outer end of the rod 84, which rod projects inwardly through the center of the coil 78 and is shown rigidly screwed into the plate 79. The plate 79 is provided with a tapped socket 86 to which is attached a pipe end 87 and it also is provided with a much larger tapped socket 90 containing the felt filter 91, and a threaded plug member 93 provided with a circular ridge 94 adapted to press the filter 91 against a corrugated wire mesh retainer screen backing 109. The outer face of the plugging member 93 is provided with a tapped socket 95 to which is attached the pipe end 118. The bottom of the socket 90 is provided with a shallow depression 99 containing the fine mesh screen 92 which prevents any fibers from the felt filter 91 that may pass the screen retainer 109 from passing into the resistor coil 78. Liquid-tight connections between the plug 93, the plate 79 and the wall of the water jacket 77 are formed by the gaskets 110 and 111, respectively.

The feed from the settling chamber, retarded by the master control resistance, is divided, as for instance, at the junction 101, part being fed to the chassis lubricating system and the greater part returning to the engine oil pan.

Figure 10:
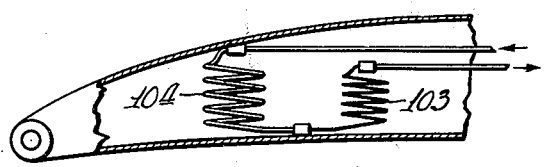
Fig. 10 is a side sectional view of the bow of a chassis showing the cooling and resistance portions of the engine return in position.

To prevent any great variation in the proportioning of the flow between the chassis system and the engine oil return, as the oil in the chassis line becomes more viscous in the cold, to which the ordinary engine return line would not be exposed, means is provided substantially to duplicate in the engine oil return, the conditions inherently existing in the chassis lines. For this purpose, a flow resistance having a restricting effect of the order of a drip plug, such as used in the chassis system, and consisting of a coil of fine bore pipe 103, diagrammatically indicated in Fig. 10, is preferably mounted in one horn of the chassis frame to be exposed to atmospheric temperature and out of the course of the warm blast of air from the engine.

Inasmuch as the course of flow from the hot master resistance 76 to the cold resistance coil 103 is relatively short, and the oil is fed from the settling chamber at considerably faster rate, ordinarily about ten times as fast as to the chassis line, the oil might not have cooled to atmospheric temperature by the time it reaches the resistance 103. It is accordingly preferred to provide extra length of conduit exposed to the atmosphere, in this case a considerable length of helical coil 104, in which the oil on its return flow to the oil pan is adequately cooled before it reaches the resistance coil 103. Both coils are clipped to the horn, as indicated.

In the chassis lubricating system, diagrammatically shown in Fig. 1, the junction fitting 101 supplies lubricant to the main 104' extending along the channel frame 105 and also supplies the spring shackle by a drip plug attached thereto. The main 104' conveys lubricant to the drip plug 106 at the front spring hinge and also to drip plugs supplying the rear chassis bearings (not shown). The main 104' is connected to the other main 121 by a suitable transverse connection at the rear of the chassis (not shown), said main 121 extending along the chassis side member 122 and supplying the drip plugs 123 and 124 at the front spring hinge and the front spring shackle, respectively. At the junction associated with the drip plug 124 is also a connection 126 to the flexible tube 127 which leads to a subsidiary front axle main 128 supplying lubricant to the knuckle structures 130 and 131.

Fig. 9 shows a typical flow metering fitting or drip plug with a body 150 having a socket 151 at its outlet end formed as a valve seat 152 with a coacting flap valve 153 retained in place by a perforated and embossed cup 154. Into the inlet socket 155 is plugged a felt strainer plug 156 having a backing 157 of wire mesh. In a longitudinal bore between the valve and the strainer is disposed a restriction pin 158 maintained by staking at 159 from engagement with the flap valve 153. Pins of different diameter are used in accordance with desired ratings of the fitting, the longitudinal bores of the fittings being preferably identical.

The drip plug body is preferably threaded at 149 for application to a tapped socket 148 in a bearing element, and has a threaded inlet end 160 for application thereto of a coupling for effecting a pipe connection. The steel bushing 164 serves to hold the felt 156 in position and provides a shoulder stopping the pipe end 163. The pipe coupling may comprise a thimble 161, screwed upon the outside of the threaded portion 160, a compression coupling sleeve 162 enclosed therein and encircling the pipe end 163, clamping the pipe in position and being in turn clamped between the beveled inner edges of the thimble 161 and the steel bushing 164.

For more rapid removal of the sand, metal chips or other hard particles ordinarily present in the new engine, than is possible with the inherently slowly operating sedimentation tank, a separate engine conditioning filter is provided and connected in parallel with the settling chamber. The engine conditioning filter, shown upon Figs. 1, 7 and 8, consists of a vertical cylindrical cap 180, the lower portion of which is spun over to grasp in liquid-tight relation the flange 182 of the base member 183. The base member 183 is provided with three tapped pipe-connecting sockets 184, 185 and 186 for attachment of the conduit 19 from the engine oil pump, the conduit 20 to the sedimentation chamber and the conduit 187 to the gauge 188 in the rear of the dashboard (see particularly Fig. 1). A major portion of the lubricant flowing through the conduit 19 flows into the standpipe 189, the upper portion of which is provided with outlet openings 189' substantially above the bottom of the chamber 190 formed within the casing 180 Clamped in the upper portion of the casing 180 between the ring 191 and the retaining screen 192 is the filter 193 through which the lubricant passes before reaching the outlet connection 194 which is flanged upon the top of the casing. The outlet connection 194 contains a tapped socket for attachment of the pipe 198 leading the filtered lubricant back to the crank case at 108, (see Fig. 1). The filter device may be attached to the front of the dashboard by means of the bracket 199.

During operation of the engine, the circulating gear pump receives oil from the bottom of the engine oil pan and forces it through the line 19, the junction 183 and the line 20 into the sedimentation tank 21 at a pressure usually in the neighborhood of 30 pounds. In the settling chamber the incoming lubricant will slowly flow down through the annular portion 28 of the sedimentation chamber in which space it will drop some of its entrained impurities and will effectively insulate the body of oil under the skirt 27, to prevent convection currents therein due to heating or cooling influences affecting the sides of the settling tank. The skirt is preferably spaced a sufficient distance from the bottom so that the settled impurities will not be disturbed by the lubricant flow, even though quite a considerable layer thereof has collected. The lubricant will then flow upwardly at a very slow rate, and this together with the increased fluidity, due to heating from the plate 23, will assure substantially complete sedimentation of any suspended impurities, with the result that a very clean oil will pass into the conduit 118 to the resistance coil 78. Any solids which may have otherwise reached the master resistance, as for instance, such as may be picked up in the passage from the sedimentation tank to the master resistance, will be filtered out by the felt 91 and the fine screen 99 will doubly ensure the exclusion of clogging foreign particles from the resistance coil 78.

Coil 78 does not contain any restriction pins or plugs and will not readily clog. It functions to offer substantially a constant resistance to the flow of lubricant throughout the engine operation, since its temperature will be maintained uniform at about 160° by the hot circulating water in the water jacket, the temperature of which is usually controlled thermostatically. Even slight variations in water jacket temperatures will not substantially affect the flow resistance, since at this temperature the viscosity of the lubricant will change but little with change in temperature. After passing through the resistance 78, the lubricant will pass to the junction 101, where it will divide, a major portion of it returning to the engine oil reservoir through the cooling and resistance lines 103—104 and a minor portion of it flowing into the chassis distributing main 104'.

While the resistance to lubricant flow through the master resistance will vary but little from winter to summer, the resistance of the return lines 103—104 and of the chassis distributing lines will change materially with changing atmospheric temperature, the resistance to lubricant flow in winter being frequently ten to one hundred times that in summer. The cooling and compensating coils 103 and 104 being placed on the chassis frame in front of the radiator where they will not be heated by radiation or by heated air current from the engine, as is the case with portions of the chassis distributing system will have a lower temperature and a proportionately higher lubricant resistance than the chassis lines in winter when the lubricant viscosity is high and correspondingly a greater proportion of lubricant will accordingly be forced into the chassis lines in winter than in summer, as compared with the proportion passed through the engine return.

When an engine conditioning filter 180 is utilized to remove grit and metallic particles during initial engine operation, this filter will at first receive lubricant and cleanse at much more rapid rate than the settling tank 21, but due to clogging, the quantity of lubricant cleansed thereby will gradually decrease so that at the end of 500 to 1,000 miles, the filter 180 will be substantially ineffective. By this time, however, the hard foreign particles initially present in the engine will have been substantially removed and the settling tank with its much lower cleansing rate will suffice to maintain the engine oil in a satisfactory degree of cleanness. In the engine conditioning filter the lubricant is caused to flow upwardly through the filter pad 193, so as to enable said filter pad to shed some of its intercepted sludge and to delay its clogging as long as possible. The chamber 180 having a lubricant inlet 189' at the top serves in a degree like the settling tank and also advantageously contributes to the same result.

In the embodiment of the invention shown, the settling tank is of quart size and is designed to function at a flow rate of about one cubic centimeter per minute while the engine conditioning filter is designed to pass initially about 10 cubic centimeters per minute.

While the various elements of the lubricant supply unit may be made in proportions or dimensions suited to the particular use to which the particular device is put, the application of the device to automobile chassis lubrication renders certain dimensions and proportions peculiarly suitable for universal service on various widely differing makes of automobiles. For such purpose the settling tank 21 may be of quart size and have a diameter of about 5½ inches and a depth of about 5⅛ inches, the skirted portion 27 thereof having a diameter of about 4⅞ inches and a depth of about 3⅛ inches, or more. The hot master resistance 78 may be composed of about 10 feet of $\frac{3}{32}$ inch bore tubing, while the return line may consist of a cooling portion containing 2 feet of 0.106 inch bore tubing and a resistance portion of 2 feet of $\frac{1}{16}$ inch bore tubing. These proportions are merely approximate and may be widely varied. It may be desirable for example to proportion the resistances of the return line, the chassis lubricant distribution system and the master resistance so that about 1% of the average output of the engine oil pump will pass through the sedimentation tank, while $\frac{1}{10}$ of this will return to the engine oil reservoir and the remainder will pass into the chassis distribution system.

Obviously, the sedimentation tank of the present invention may be used to cleanse oil solely for the engine distribution system or solely for the chassis distribution system. The engine conditioning filter is utilized only when it is desired to clean the engine oil quickly during initial periods of engine operation. Instead of resistances in the form of fine bore tubing, various other restricting or resistance devices may be utilized.

Occasionally the sludge collected in the settling chamber should be removed, which according to the present invention is rendered easy without the need for dismantling the tank. Preferably a draining sleeve 46 in the bottom of the tank is normally closed by a valve 31 mounted upon an arm 34 having ears 43—43 keyed illustratively upon a hexagonal rod 53. The rod 53 has bearing mounts 45 within the ears 61 of a carrying bracket 60 secured to the bottom of the settling tank 21. A spring 57 coiled about the hexagonal rod 53 between the ears 61 reacts at one end 62 against said bracket 60 and at the other against a stop lug 47 on a metal washer 65 keyed upon the hexagonal rod 53, thereby urging the valve 31 to closed position. Keyed upon the outer end of the rod 53 is an operating arm 58 comprising a metal loop 59, into which a screw driver or other tool would be inserted to rock the rod and thereby to open the valve 31.

While the valve may be of any of various constructions, I have shown one having a facing of vellumoid or equivalent material 44 mounted in a case 50, carrying a backing disk 49, to which is riveted a stud 33 extending through the arm 34 and attached with respect thereto by a cotter pin 42 reacting against a spring washer 48 encircling the stud.

In a preferred embodiment, the valve 31 is interconnected with a venting structure 132 at the top of the tank, which facilitates drainage of the sludge when the valve and with it the vent, are simultaneously opened. For this purpose a venting thimble 140 is fixed to the top of the tank at a slight inclination, through which extends a rod 136 encircled by a coil spring 139 reacting against a head 138 to which is riveted a dust excluding protective hood 141. The rod 136 carries a disk 135 normally closing the venting thimble 140 due to the action of the spring 139. A wire 144 connects the rod 136 with an eye 145 upstruck from the valve and protruding through the seating disk.

To empty the sludge from the setting chamber, an operation preferably performed at such time as the engine oil is replaced, the operator merely turns the handle loop 58 by means of a screw driver, thereby opening the valve 31 and simultaneously with it the vent 140 so that the sludge readily falls out. Release of the handle 58 allows the stressed coil spring 57 immediately to snap the valve 31 closed and the spring 139 to snap the vent 140 closed. The empty settling tank will rapidly fill with engine oil when vehicle operation is resumed and the normal operation above described again takes place.

It is understood that the coil spring 57 seats the valve 31 with such pressure that under the normal operation of the vehicle, the pump pressure in the order of 25 to 35 pounds per square inch, will be ineffective to cause leak past the valve seat 44.

The settling tank of Figs. 3, 4 and 5 may also be provided with a check valve to prevent the formation of a syphoning passage from the outlet of the engine oil return through the master resistance and the sedimentation tank to the gear pump intake, a ball check valve 39 is illustratively shown for this purpose cooperating with a seat 40 in the outlet connection 35 and retained in place by the plug 41.

It is to be understood that there may be many changes and modifications made in the construction and the arrangement of the details of my invention without departing from the scope thereof, and I intend to include all such variations as fall within the scope of the appended claims in this application, in which only the preferred forms of my invention have been disclosed.

I claim:

1. A lubricant distributing installation for a plurality of bearings adapted to be enclosed and provided with means to collect excess lubricant therefrom comprising an oil reservoir, a circulatory lubricating system for said bearings supplied from said reservoir and cleansing apparatus adapted to receive and cleanse a part of the circulating oil body, said cleansing apparatus including cleansing instrumentalities, said cleansing instrumentalities being of the type respectively which clog and do not clog during the cleansing operations, said instrumentalities functioning concurrently so that the rate of cleansing will be retarded after continued use, as a result of the progressive clogging of the first mentioned instrumentality.

2. A lubricant distributing installation for a plurality of bearings adapted to be enclosed and provided with means to collect excess lubricant therefrom comprising an oil reservoir, a circulatory system for said bearings supplied from said reservoir and a cleansing system in parallel with said circulatory system including a filter cleanser and a sedimentation cleanser in parallel, and means in the course of flow from said sedimentation cleanser imposing a high retarding effect thereon to assure slow feed through the sedimentation cleanser.

3. A lubricant distributing installation for a plurality of bearings adapted to be enclosed and provided with means to collect excess lubricant therefrom comprising an oil reservoir, a circulatory lubricating system for said bearings supplied from said reservoir and a cleansing system in parallel with said circulatory system, said cleansing system including two cleansers in parallel, one of the type subject to clogging by interception of foreign particles and the other of the sedimentation type and means at the outlet side of said latter cleanser imposing a substantial resistance to flow therethrough so that the output through the clogging filter is much greater than that through the sedimentation cleanser prior to the clogging of the former.

4. A lubricant distribution installation for a plurality of bearings adapted to be enclosed and provided with means to collect excess lubricant therefrom comprising a lubricant reservoir, a circulatory lubricant distribution system for said bearings supplied from said reservoir, a shunt passage for the lubricant passing through said circulatory system, a sedimentation tank in said shunt passage and a substantial resistance in said shunt passage determining the proportion of oil passing therethrough.

5. A lubricant distributing installation for a plurality of bearings some of which are adapted to be enclosed and provided with means to collect excess lubricant therefrom and others of which are not so adapted comprising a lubricant reservoir, a circulatory lubricant distribution system for the former bearings supplied therefrom, a non-circulatory lubricant distribution system for the latter bearings and means associated with both of said systems adapted to cleanse the lubricant supplied thereto and another means connected to cleanse only lubricant supplied to the circulatory installation.

6. A lubricant distributing installation for a plurality of bearings some of which are adapted to be enclosed and provided with means to collect excess lubricant therefrom and others of which are not so adapted comprising an oil reservoir, a circulatory distribution system for the former bearings supplied from said reservoir, a second distribution system for the latter bearings supplied from said reservoir and a sedimentation apparatus in series with said second distribution system and in parallel with said circulatory distribution system.

7. A lubricant distributing installation for a plurality of bearings some of which are adapted to be enclosed and provided with means to collect excess lubricant therefrom and others of which are not so adapted comprising an oil reservoir, a circulatory distribution system for the former bearings supplied from said reservoir, a second distribution system for the latter bearings supplied from said reservoir, a sedimentation apparatus in series with said second distribution system and in parallel with said circulatory distribution system and means for heating the lubricant in said sedimentation apparatus in the latter stages of its passage therethrough.

8. A lubricant distribution installation for a plurality of bearings some of which are adapted to be enclosed and provided with means to collect excess lubricant therefrom and others of which are not so adapted comprising an oil reservoir, a circulatory lubricant system for the former bearings, a non-circulatory lubricant system for the latter bearings, a cleansing apparatus common to both of said systems and proportioning resistances associated with each of the said systems designed to divide the lubricant after passing through said cleansing apparatus, the resistance of the circulatory system being substantially less than the resistance of the non-circulatory system and means for maintaining a fixed relationship between the temperatures of said resistances.

9. A lubricant distribution installation for a plurality of bearings some of which are adapted to be enclosed and provided with means to collect excess lubricant therefrom and others of which are not so adapted comprising an oil reservoir, a circulatory lubricant system for the former bearings, a non-circulatory lubricant system for the latter bearings, a cleansing apparatus common to both of said systems and proportioning resistances associated with each of the said systems designed to divide the lubricant after passing through said cleansing apparatus, the resistance of the circulatory system being substantially less than the resistance of the non-circulatory system and means for maintaining both of said resistances at about the same temperature.

10. A lubricant distributing installation for a plurality of bearings some of which are adapted to be enclosed and provided with means to collect excess lubricant therefrom and others of which are not so adapted comprising an oil reservoir, a circulatory lubricant system for the former bearings, a non-circulatory lubricant system for the latter bearings, a source of pressure for forcing lubricant from said reservoir into said systems, a cleansing apparatus common to both of said systems, proportioning resistances associated with each of said systems designed to divide the lubricant after passing through said cleansing apparatus and means for maintaining the proportioning resistance of the circulatory system at a somewhat lower temperature than that of the non-circulatory system.

11. A lubricant distributing installation for a plurality of bearings some of which are adapted to be enclosed and provided with means to collect excess lubricant therefrom and others of which are not so adapted comprising a lubricant reservoir, a circulatory lubricant system for the former bearings supplied therefrom, a non-circulatory lubricant system for the latter bearings also supplied therefrom, a master resistance common to both of said systems, means to maintain said resistance at a substantially elevated temperature, proportioning resistances individual to each system and means for maintaining each of said proportioning resistances at about atmospheric temperature.

12. A lubricant distributing installation for a plurality of bearings some of which are adapted to be enclosed and provided with means to collect excess lubricant therefrom and others of which are not so adapted comprising a lubricant reservoir, a circulatory lubricant distribution system for the former bearings supplied therefrom, a non-circulatory lubrication distribution system for the latter bearings supplied therefrom, a cleansing apparatus common to both systems, another cleansing apparatus individual to the circulatory system, a control resistance of nearly constant temperature common to both systems and individual proportioning resistances associated with each of said systems, the total resistance of the circulatory system being substantially less than the total resistance of the non-circulatory system.

13. A chassis-engine lubricating arrangement comprising an engine oil reservoir, a gear pump adapted to receive its supply of oil therefrom, an engine lubricant distribution system receiving lubricant from said gear pump, a filter receiving lubricant from said gear pump, an outlet conduit from said filter back to said reservoir, a sedimentation tank supplied from said gear pump, a flow resistance supplied from said sedimentation tank, means for maintaining said flow resistance at an elevated temperature, a chassis lubricating system provided with restricted outlets adapted to receive a part of the lubricant passing through said resistance, a return conduit from said resistance to said engine reservoir and a second resistance in said last mentioned conduit positioned upon the chassis frame.

14. A chassis lubricating system comprising a lubricant reservoir, a series of conduits adapted to supply the said chassis bearings, a pump adapted to force lubricant from said reservoir into said conduits and a resistance consisting in part of a long coil of unrestricted fine bore tubing between said pump and said conduits.

15. A chassis lubricating system comprising a lubricant reservoir, a series of conduits connected to said chassis bearings, a series of flow measuring devices in said conduits adapted to proportion the lubricant to said chassis bearings, a pump for forcing lubricant from said reservoir into said conduits, a resistance serving as a by-pass from said pump to said reservoir and means for maintaining said resistance at atmospheric temperature.

16. In combination with a chassis composed of longitudinal side members and a series of transverse members connecting said longitudinal members and supporting an engine and a radiator adjacent to but a substantial distance away from the front of said side members; a lubricating installation for the bearings of said chassis comprising a lubricant reservoir, a series of conduits connected to said chassis frame and leading to said chassis bearings, a pump for forcing lubricant from said reservoir into said conduits and a resistance serving as a by-pass for part of the lubricant between said pump and said reservoir, said resistance being supported in and attached to one of the longitudinal chassis members in front of the engine-radiator combination.

17. A lubricating system for chassis bearings comprising a lubricant reservoir, a series of conduits adapted to supply said chassis bearings, a series of restricted outlets in said conduits adapted to proportion the lubricant to said chassis bearings, a pump for forcing lubricant from said reservoir into said conduits, a control resistance between said pump and said conduits offering substantially greater resistance to the flow of lubricant than the resricted outlets in the conduits and a return resistance connected as a by-pass for lubricant from said control resistance to said reservoir, both of said resistances being composed of coils of substantially unrestricted fine bore tubing and the by-pass resistance having a substantially lesser flow obstructing effect than the combined flow obstructing effect of the restricted outlets in said conduits.

18. A lubricating system for chassis bearings comprising a lubricant reservoir, a series of conduits leading to said chassis bearings, flow metering devices adjacent to the ends of said conduits leading to said bearings, a sedimentation purifying apparatus between said reservoir and said conduits and means for heating the lubricant in said sedimentation apparatus in the latter stages of its passage therethrough.

19. In combination with a chassis with bearings provided with an internal combustion engine having an exhaust manifold, a lubricating installation for the bearings of said chassis comprising a lubricant reservoir, a series of conduits leading to the chassis bearings, a pump adapted to supply lubricant to said conduits from said reservoir, a cylindrical sedimentation chamber between said pump and said conduits and a metallic supporting plate for said chamber directly connected to the top thereof and serving to conduct heat from the exhaust manifold to the top of the chamber.

20. A lubricating system for chassis bearings comprising a lubricant reservoir, a series of conduits leading to said chassis bearings, a pump, a settling chamber and a resistance positioned in the order named between said reservoir and said conduits through which the lubricant is adapted to pass on its way from said reservoir to said conduits, a by-pass from said resistance back to said reservoir and means to maintain a part of said by-pass at substantially the same temperature as the conduits.

21. A lubricating system for the bearings associated with a chassis frame comprising a lubricant reservoir, a gear pump adapted to receive lubricant from said lubricant reservoir, a settling chamber adapted to receive lubricant from said gear pump, a resistance adapted to receive lubricant from said settling chamber, a conduit system adapted to supply lubricant to the various bearings and another conduit system adapted to return part of the lubricant from the resistance to the reservoir, both of said conduit systems being attached to and having substantially the same temperature as the chassis frame.

22. In combination with an automotive vehicle provided with a chassis, an engine, a dashboard to the rear of said engine, a radiator to the front of said engine a substantial distance away from the front of the chassis, an exhaust manifold associated with said engine between said radiator and said dashboard and a water jacket also associated with said engine, a lubricant reservoir substanially below said engine, a gear pump associated with said reservoir, a relief valve associated with said gear pump and a circulatory engine lubricating system being adapted to be supplied from said gear pump; a lubricant cleansing and distributing installation comprising a filter and a sedimentation chamber connected in parallel and supplied from said gear pump, a conduit from the filter for conducting the filtered lubricant back to the reservoir, a metallic plate connecting the top of the sedimentation chamber and the exhaust manifold, a coil of fine bore resistance tubing supplied from said sedimentation tank and enclosed within the water jacket, a chassis distributing system supplied from said resistance and an additional resistance conducting a part of the lubricant from said first mentioned resistance back to the reservoir also consisting in part of a coil of fine bore tubing and being positioned upon the chassis frame in front of the radiator.

23. In combination with a motor vehicle of the type having an engine with a plurality of bearings, a casing for said engine, and a chassis supporting said casing also having a plurality of bearings; a lubricating installation for said bearings including a circulatory system for the engine bearings comprising a reservoir in said casing, a pump in said reservoir and distributing lines from said pump to said engine bearings, said reservoir receiving any excess lubricant from said bearings, and a non-circulatory system comprising piping extending along said chassis and leading to said chassis bearings provided with flow proportioning restricted outlets at said chassis bearings, and a resistance connection between said pump and said chassis system for supplying lubricant thereto, said connection being also provided with a restricted return to said reservoir.

24. The installation of claim 23 in which the restricted outlets of the non-circulatory system and the restricted return are all supported upon the chassis frame, the restricted return being supported upon a portion of the frame which is in front of the engine.

25. The installation of claim 23 in which the restricted connection is provided with a lubricant cleansing apparatus and in which another cleansing apparatus is connected in parallel between the pump and the engine reservoir.

JOSEPH BIJUR.